Oct. 8, 1946.                    E. SIRP                    2,409,160
                              WORK SUPPORT
                 Filed June 29, 1944          2 Sheets-Sheet 1

INVENTOR
E. SIRP
BY Harry L. Duft
ATTORNEY

Oct. 8, 1946.   E. SIRP   2,409,160
WORK SUPPORT
Filed June 29, 1944   2 Sheets-Sheet 2
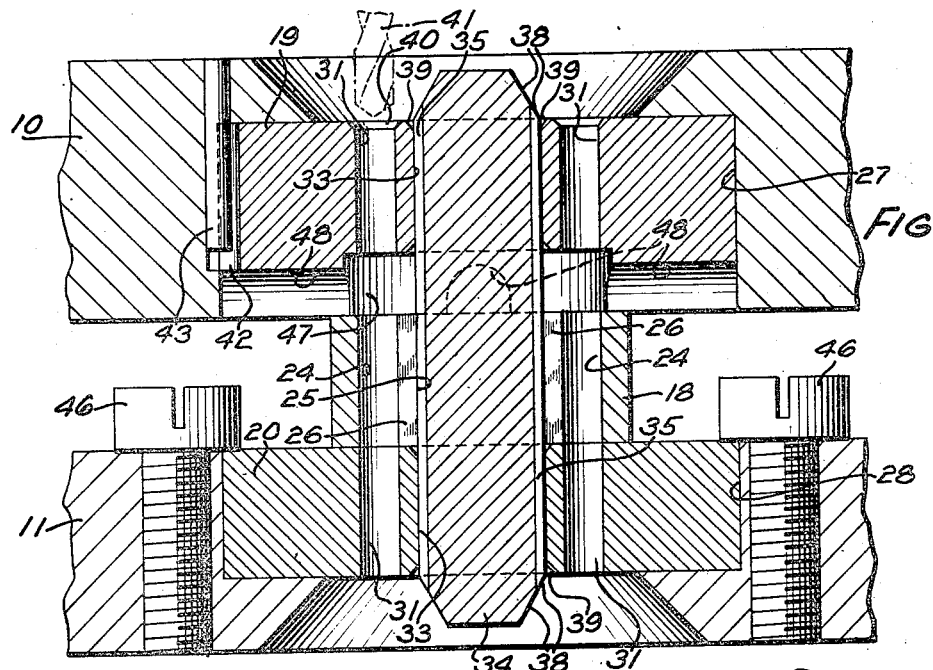
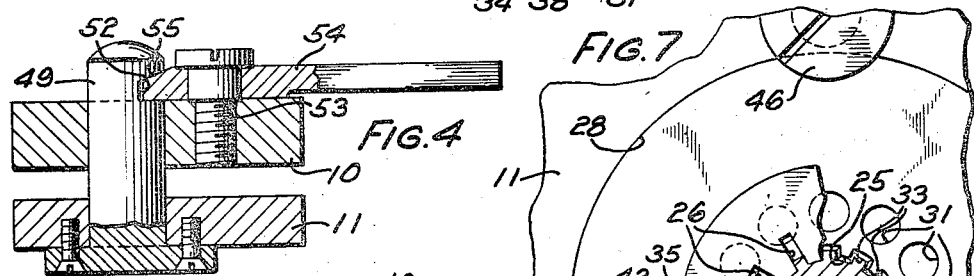
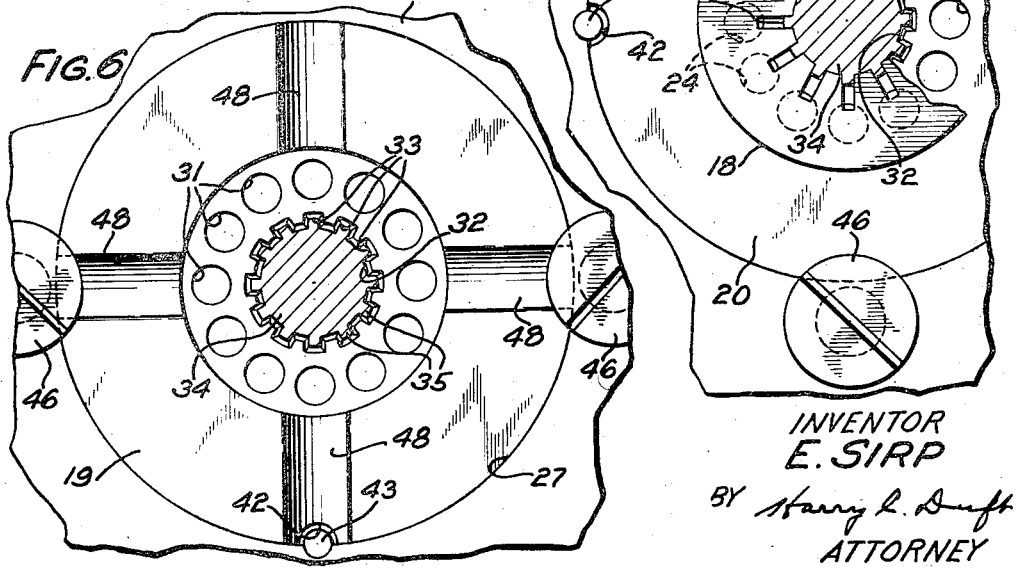
INVENTOR
E. SIRP
BY Harry R. Duft
ATTORNEY Patented Oct. 8, 1946

2,409,160

UNITED STATES PATENT OFFICE 2,409,160

WORK SUPPORT

Emil Sirp, Downers Grove, Ill., assignor to Western Electric Company, Incorporated, New York, N. Y., a corporation of New York Application June 29, 1944, Serial No. 542,760

6 Claims. (Cl. 77—62)

This invention relates to work supports and more particularly to a work supporting jig for mounting work upon the bed of a machine tool during machining operations.

The invention is particularly useful in the manufacture of anode inserts for magnetron type vacuum tubes. Such an insert may comprise an annulus of copper with an outside diameter of .595", in which twelve apertures of .079" diameter are to be drilled in concentric arrangement with respect to a preformed central aperture of .204" diameter, from which twelve preformed slots of .021" in width extend radially, each of which is to communicate with one of the smaller apertures which are to be so located that the longitudinal median lines of the slots coincide with the axes of the central and smaller apertures. Great difficulty has been encountered in so locating the smaller apertures to be drilled due to the minute dimensions involved and the high degree of accuracy required in aligning the smaller apertures with the slots.

An object of the present invention is to provide a practicable and efficient work support for handling work of the nature described above.

In accordance with the above object, the present invention, in one embodiment thereof, as applied to a drill jig for supporting an anode insert of the type described hereinbefore, for use in magnetron vacuum tubes, comprises two aligned plates between which the insert is clamped, the inner opposed faces of the plates having shouldered apertures for receiving in flush relation two annular shaped drill guides having their inner opposed faces abutting the outer parallel faces of the insert. The drill guides are each similarly provided with a series of drill guiding apertures arranged on centers and having diameters corresponding to the apertures to be drilled in the insert, the central apertures of the guides having a dimension similar to that of the central aperture of the insert. Formed in the peripheral walls of the central apertures in the guides are radially extending short slots arranged on centers corresponding to the slots in the insert. After a preliminary aligning of the drill guide slots with those of the insert, an aligning pin formed with radially extending teeth corresponding in number and arranged to fit closely into the aligned slots of the drill guides and insert is inserted to finally align the slotted parts. Means including a cam lever is provided for retaining the jig plates, drill guides and insert in operative assembled relation.

Other objects and advantages of this invention will more fully appear from the following detailed description, taken in conjunction with the accompanying drawings in which Fig. 1 is a plan view of a work supporting jig embodying the features of this invention;

Fig. 4 is a transverse vertical irregular section taken on the line 4—4 of Fig. 1;

Figure 1:
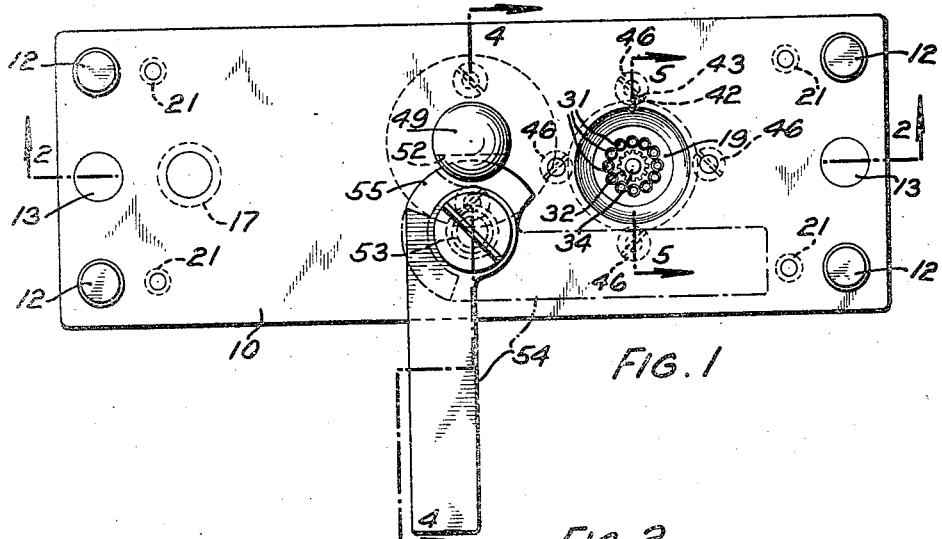
Figure 2:
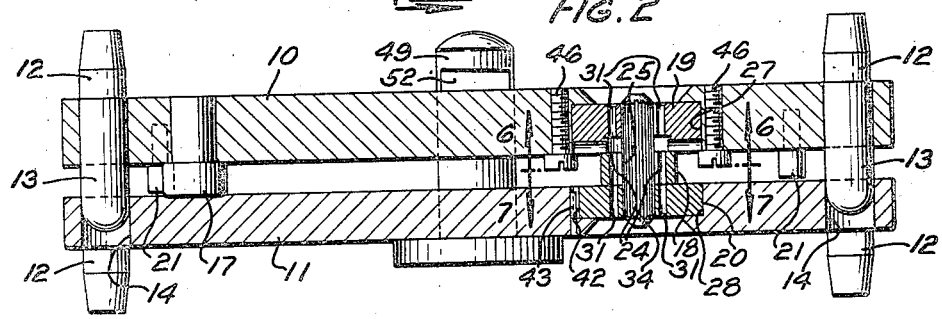
Fig. 2 is a longitudinal vertical section taken on the line 2—2 of Fig. 1.

Fig. 5 is an enlarged fragmentary transverse vertical section taken on the line 5—5 of Fig. 1; and Figs. 6 and 7 are enlarged fragmentary bottom and plan views of the upper and lower jig plates taken on irregular lines 6—6 and 7—7, respectively, of Fig. 2.

Referring to the drawings, particularly to Figs. 1 and 2, the work supporting jig in the present embodiment comprises two rectangular shaped steel plates 10 and 11 provided at each end with a pair of feet 12 for supporting the assembled jig when in use upon a bed of a drill press (not shown) or in supporting each plate when the jig is disassembled. In the latter case, the plate 10 is rotated 180° from the position shown in Figs. 1 and 2. The plate 10 carries at each end intermediate the feet 12 a vertical aligning pin 13, the pins being arranged to freely enter apertures 14 similarly arranged in the plate 11. Also carried by the plate 10 at its left end (Fig. 2) is a stop or gauge member 17, which maintains the space between the assembled plates at such end of the assembled plates to the thickness of an anode insert 18 interposed between the plates adjacent the opposite ends thereof. The upper end face of the insert 18 abuts the lower face of the plate 10, in which is carried an annular drill guide 19 flush with such face of the plate, while the lower face of the insert abuts the upper end face of an annular drill guide 20 carried in and flush with the upper face of the plate 11. Thus, the plates 10 and 11 are parallel when the jig is assembled and in use. For the purpose of limiting any unparallelism of the plates 10 and 11 which may occur, the plate 10 carries adjacent each end a pair of pins 21, which normally are spaced a few thousandths of an inch from the upper face of the plate 11 (Fig. 2).

The anode insert 18, as hereinbefore described, comprises an annulus of copper in which is to be drilled, in the present example, twelve apertures 24 (Figs. 1, 5 and 7) arranged concentrically relative to a preformed central and larger aperture 25, from which radially extend twelve preformed slots 26, each of which is to communicate with one of the apertures 24 on a line coinciding with the axes of the apertures 24 and 25, the diameters of the anode, central and smaller apertures and the communicating slots being of the dimensions previously mentioned.

Formed in the plates 10 and 11 are aligned shouldered apertures 27 and 28 (Figs. 5, 6 and 7) for receiving the drill guides 19 and 20, respectively, the apertures having their outer smaller ends flared for clearance purposes. Each of the drill guides is similarly formed with a series of drill guiding apertures 31 arranged on centers and having diameters corresponding to the apertures 24 to be drilled in the anode insert 18. Also formed in each of the drill guides 19 and 20 are central apertures 32 having radially extending relatively short slots 33 arranged on centers corresponding to and similar in width to the slots 26 of the anode insert 18. In order to accurately position the drill guides 19 and 20 with respect to the insert 18 to be drilled so that the axes of the apertures 24 to be drilled in the insert 18 will coincide with the median line of the preformed slots 26 thereof, an aligning pin 34 is provided having a series of longitudinally extending teeth or ribs 35 arranged on centers corresponding to the slots 33 of the drill guides 19 and 20 and the slots 26 of the insert 18 and in which they snugly fit when the jig and insert are assembled for drilling operations, which assemblage will be presently described. To facilitate the entrance of the pin 34 and its ribs 35 into the apertures 32 and 25 and slots 33 and 26, opposite ends of the pin and its ribs are bevelled, as indicated at 38, and the opposite ends of the walls of the slots 33 are also bevelled at 39.

The apertures 31 of the drill guide 19 are bevelled at 40 for guiding a drill, indicated in broken outline at 41, into the aligned aperture. A notch 42 in the periphery of each of the drill guides 19 and 20 and cooperating pins 43 fixed in the plates 10 and 11 serve to initially arrange the drill guides in substantially their desired positions, the notches being of such dimensions that the guides will rotate slightly in one direction or the other when the pin 34 is mounted in position to finally accurately align the guides with the insert 18 to be drilled. To retain the drill guides 19 and 20 in the plates 10 and 11, respectively, a pair of diametrically opposite screws 46 are threaded into each of the plates until the inner annular face of the heads of the screws abut the adjacent face of the plates. In order to facilitate the escape of the drill shavings or chips and also in the cleaning of the jig, the drill guide, upon its lower face, is centrally counterbored at 47 and notched therefrom to its periphery at four equally spaced points 48 (Figs. 5 and 6).

After complete assemblage of the jig and anode insert 18 to be drilled, as shown in Figs. 1, 2 and 5, the parts are clamped together by the following means. Fixed to the lower face of and extending through an aperture in the plate 11 (Fig. 4) is a flanged post 49 formed adjacent its upper end with a horizontal cam slot 52. The plate 10 is provided with an aperture for receiving the upper end of the post 49, the bottom face of the cam slot 52 being in the plane of the upper face of the plate 10. Pivoted at 53 to the plate 10 is a cam lever 54 having a cam face 55, which, when the lever is rocked from its broken outline position to its full line position (Fig. 1), enters the cam slot 52 of the post 49 and in cooperation therewith clamps and holds the parts together.

Figure 3:
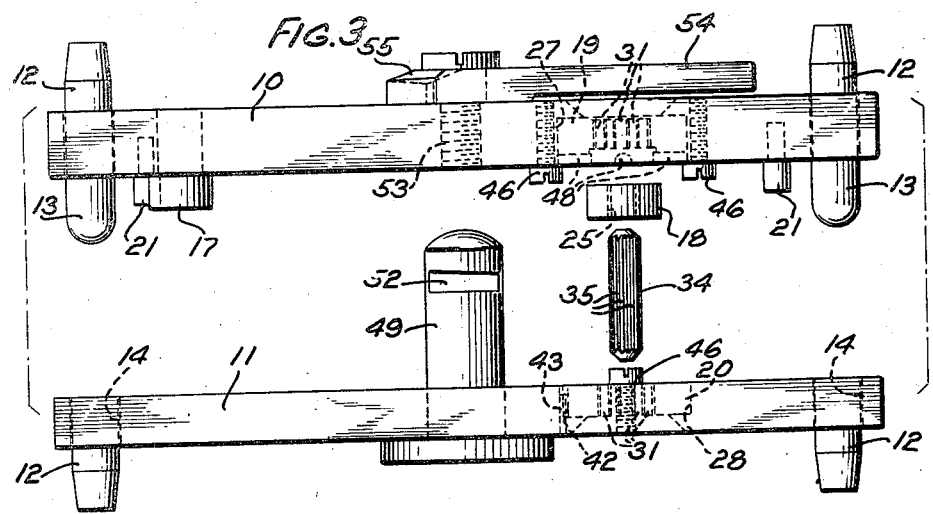
Fig. 3 is a side view of the two jig plates carrying the drill guides, the aligning pin and an anode insert to be drilled, shown in separated relation before assemblage.

To assemble the jig plates 10 and 11, each carrying its respective drill guide 19 and 20 retained therein in the manner previously described, the aligning pin 34 and an anode insert 18 accurately angularly positioned and clamped between the plates, the following procedure may be employed:

Referring particularly to Fig. 3, wherein the parts are shown in separated relation, the aligning pin 34 may be first inserted in the aperture 32 of the drill guide 20 with the ribs 35 of the pin riding snugly into the slots 33 of the guide. Thereafter, the anode insert 18 is threaded onto the pin 34 with the pin ribs 35 snugly fitting the slots 26 of the insert. The plate 10 is then aligned with the plate 11 and lowered into position to thread the aligning pin 34 through the aperture 32 of the drill guide 19 in the manner of threading the pin 34 into the aperture 32 of the drill guide 20, previously referred to. At the same time, the post 49 is threaded through the aligned aperture in the plate 10. As thus arranged, the drill guiding apertures 31 of the guides 19 and 20 will be in accurate axial alignment and the slots 26 of the anode insert 18 to be drilled will be accurately centrally aligned on lines passing through the axis of the apertures 24 and 25 of the insert. After rocking the cam lever 54 to its full line position (Figs. 1 and 4) to clamp the parts together, the anode insert 18 is ready to have the apertures 24 drilled therein by the drill 41, the jig being mounted upon the bed of a drill press in any suitable manner.

What is claimed is:

1. A work support and tool jig for guiding a tool to a predetermined point on a work piece having a preformed aperture and a slot extending therefrom with which said point is to be accurately located comprising apertured supports between which a work piece is supported, adjustable tool guides between said supports abutting opposite faces of a work piece, each of said guides having an aligned central aperture and alignable tool guiding apertures, said central apertures having alignable slots extending therefrom and similarly located relative to the tool guiding aperture as said work piece slot is to said point, and an aligning member enterable into said central apertures of the guides and work piece and having a peripheral projection fitting into the alignable slots of the guides and work piece.

2. A work support and tool jig for guiding a tool to a predetermined point on a work piece having a preformed aperture and a slot extending therefrom with which said point is to be accurately located comprising separable supports between which a work piece is supported, annular tool guides rotatably carried in inner opposed apertured faces of said supports and abutting opposite faces of a work piece, each of said guides having aligned central apertures and alignable tool guiding apertures, said central apertures having alignable slots extending therefrom and similarly located relative to the tool guiding aperture as said work piece slot is to said point, an aligning pin enterable into said central apertures of the guides and work piece and having a peripheral projection fitting into the alignable slots of the guides and work piece, and means for releasably maintaining said supports and guides in clamping relation with the work piece.

3. A work support and tool jig for guiding a tool to a predetermined point on a work piece having a preformed aperture and a slot extending therefrom with which said point is to be accurately located comprising separable supports between which a work piece is supported, means for maintaining said supports in accurate alignment, tool guides carried in and capable of slight rotation in inner opposed apertured faces of said supports and abutting opposite faces of a work piece, means for predeterminedly limiting such rotation of said guides, each of said guides having aligned central apertures and alignable tool guiding apertures, said central apertures having alignable slots extending therefrom and similarly located relative to the tool guide aperture as said work piece slot is to said point, an aligning pin enterable into said central apertures of the guides and work piece and having a peripheral projection fitting into the alignable slots of the guides and work piece, and means for releasably maintaining said supports and guides in clamping relation with the work piece.

4. A work support and tool jig for guiding a tool to predetermined points on a work piece having a preformed aperture and slots extending therefrom with which said points are to be accurately located comprising separable supports between which a work piece is supported, means for maintaining said supports in lateral, longitudinal and parallel alignment, tool guides rotatably carried in inner opposed apertured faces of said supports and abutting opposite faces of a work piece, means on each of said supports cooperating with peripheral notches of said tool guides for permitting slight rotary movement of said supports, each of said guides having aligned central apertures and a series of alignable tool guiding apertures, said central apertures having a series of alignable slots extending therefrom and each similarly located relative to the tool guiding apertures as said work piece slots are to said points, an aligning member enterable into said central apertures of the guides and work piece and having a series of peripheral projections fitting into the alignable slots of the guides and work piece, and means for releasably maintaining said supports and guides in clamping relation with the work piece.

5. A work support and tool jig comprising a plate having an aperture, a work piece support freely rotatably mounted for limited rotation in said aperture and having a tool guiding aperture, means carried by said plate cooperating with a formation on said support for predeterminedly limiting the rotation of said support, and a member having peripheral formations engageable in alignable slots formed in central apertures in said support and the work piece to maintain said support and work piece in predetermined alignment.

6. A work support and tool jig comprising apertured plates between which a work piece is supported, work piece supports freely rotatably mounted for limited rotation in the apertures of said plates abutting opposite faces of a work piece and having alignable tool guiding apertures, means carried by said plates cooperating with formations on said supports for predeterminedly limiting the rotation of said supports, and a member having peripheral formations engageable in alignable slots formed in central apertures in said supports and the work piece to maintain said supports and work piece in predetermined alignment.

EMIL SIRP.